M. SORENSEN.
STEERING GEAR.
APPLICATION FILED NOV. 1, 1919.

1,435,990.

Patented Nov. 21, 1922.

Inventor
Magnus Sorensen
By: Arthur F. Durant
Atty.

Patented Nov. 21, 1922.

1,435,990

UNITED STATES PATENT OFFICE.

MAGNUS SORENSEN, OF WINTHROP HARBOR, ILLINOIS, ASSIGNOR, BY MESNE ASSIGN-
MENTS, TO F. C. AUSTIN MACHINERY COMPANY, A CORPORATION OF ILLINOIS.

STEERING GEAR.

Application filed November 1, 1919. Serial No. 334,925.

*To all whom it may concern:*

Be it known that I, MAGNUS SORENSEN, a citizen of the United States of America, and a resident of Winthrop Harbor, Illinois, have invented a certain new and useful Improvement in Steering Gears, of which the following is a specification.

This invention relates to steering gear for motor driven vehicles, more particularly to tractors, such, for example, as those employing caterpillar traction. In machines of this kind, it frequently happens that the body of the machine, such as that of an excavator or similar machine, is necessarily mounted on a turn-table. Under such circumstances, the steering of the vehicle, which is ordinarily accomplished by controlling the driving mechanism, thereby to cut out the transmission to either side of the vehicle, must be accomplished through the medium of a rotary hand wheel mounted on the turn-table body, and this involves a situation which makes it desirable to disconnect the steering column or hand wheel shaft from the balance of the steering gear, when the body is rotated or revolved on the turn-table, thereby to avoid the rapid rotation of the hand wheel, which would result from leaving it connected to the gearing which constitutes a part of the means for controlling the transmission of power. The invention relates more especially, therefore, to the arrangement for disconnecting the hand wheel shaft from the other elements of the steering gear.

Generally stated, the object of the invention is to provide a steering gear disconnecting device which can be operated by hand in simple and convenient manner.

It is also an object to provide certain details and features of construction tending to render a steering gear disconnecting device of this particular character more satisfactory and reliable in use.

To these and other useful ends the invention consists in matters hereinafter set forth and claimed and shown in the accompanying drawings, in which—

Figure 1:
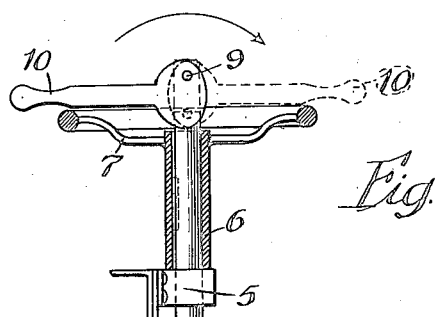
Fig. 1 is a vertical sectional view of a steering gear hand wheel and other parts embodying the principles of the invention.
Figure 2:
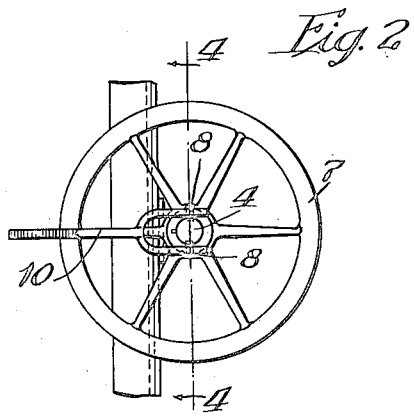
Fig. 2 is a plan of the construction shown in Fig. 1.
Figure 3:
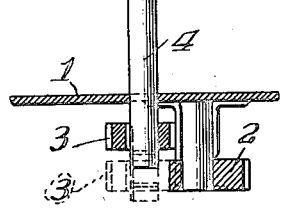
Fig. 3 is a perspective of the hand lever and cam by which the hand wheel shaft is raised and lowered.
Figure 3:
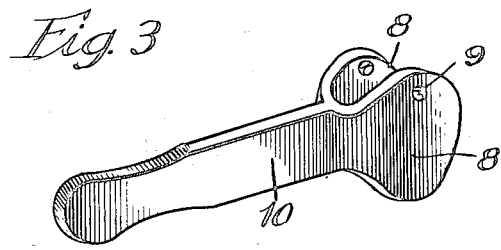
Figure 4:
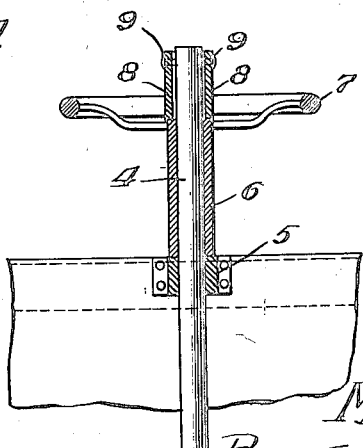
Fig. 4 is a vertical section on line 4—4 in Fig. 2.

As thus illustrated, the invention comprises a turn-table body 1, of any suitable character, mounted in the ordinary or any desired manner to turn or revolve about a vertical axis, as is necessary in certain excavating or other similar machines. The idler 2 is mounted to turn about a vertical axis below the said body, and is adapted to be connected with the gearing and other elements (not shown) through the medium of which the transmission of power is controlled to steer the vehicle, as is common in caterpillar tractors or excavating machines employing the caterpillar style of traction. The pinion 3 engages said idler and is suitably secured to the lower end of the vertically disposed hand wheel shaft 4, the latter being mounted in a bearing 5 suitably supported on the body of the machine. A sleeve 6 extends upwardly from this bearing, and rests normally thereon, but is keyed or splined to the shaft 4, so that the latter can slide up and down in said sleeve, notwithstanding the fact that the latter rotates with the shaft. The hand wheel 7 is rigidly secured or otherwise united to the upper end of the sleeve 6, whereby said hand wheel is available for the rotation of the shaft 4 to steer the vehicle. The two cams 8 are pivoted at 9 on the upper end of the hand wheel shaft 4, in position to bear upon the upper edges of the sleeve 6, and are rigidly and preferably integrally united to a hand lever 10 which extends horizontally above the hand wheel. The two cams are so formed, it will be seen, that when the hand lever is in the position shown in dotted lines in Fig. 1, the shaft 4 is then in its operative position, with the pinion 3 engaging the idler 2, so that the controlling connection between the hand wheel and the other steering gear elements is closed. On the other hand, when the hand lever 10 is in the position shown in full lines in Fig. 1, the two cams 8 are then in such engagement with the upper end of the sleeve 6 that the shaft 4 is held in elevated position, thus holding the pinion 3 out of engagement with the idler 2, whereby the turn-table body can be rotated without spinning or rotating the hand wheel, as previously stated.

Obviously, therefore, with this arrangement, the lifting of the hand wheel shaft is accomplished readily and merely by raising one hand from the hand wheel to the lever 10, and by pulling the latter over into the position shown in full lines in Fig. 1, and as soon as the turntable body has been revolved to the desired position, said lever 10 is then conveniently swung over to the position shown in dotted lines in Fig. 1, thus restoring the steering gear to operative condition.

Thus the endwise shifting of the steering shaft 4 serves to render the steering control inoperative, so that the steering hand wheel 7 will have no control over the vehicle, and whereby the turntable can rotate without rotating the hand wheel, as explained.

What I claim as my invention is:—

1. In steering gear for a self-propelled machine having a turn-table, the combination of a hand wheel provided with a downwardly extending main steering shaft slidably mounted therein, a gear connection at the lower end of said shaft, and hand-operated mechanism upon the upper end of said shaft for shifting the latter lengthwise to open and close said gear connections.

2. A structure as specified in claim 1, said mechanism comprising a sleeve rigid with the hand wheel and keyed on said shaft, so that the shaft can slide up and down in said sleeve, and including a hand lever carried on the shaft and provided with means for engaging the upper end of said sleeve.

3. A structure as specified in claim 1, said mechanism comprising a hand lever pivoted on the upper end of said shaft, a cam rigid with said lever, and means engaging said cam.

4. A structure as specified in claim 1, said hand wheel and mechanism being carried on said turn-table.

5. A structure as specified in claim 1, in combination with a bearing on the turntable to support said shaft.

6. A structure as specified in claim 1, said gearing comprising an idler on the turntable and a pinion on said shaft to engage and disengage said idler.

7. A structure as specified in claim 1, said mechanism comprising means operative to retain the shaft in raised position to permit rotation of the turntable without rotating the shaft and hand wheel.

Signed.

MAGNUS SORENSEN.